US005721375A

United States Patent [19]

Bidner

[11] Patent Number: 5,721,375

[45] Date of Patent: Feb. 24, 1998

[54] METHOD AND APPARATUS FOR MONITORING A VALVE DEACTIVATOR ON A VARIABLE DISPLACEMENT ENGINE

[75] Inventor: David Karl Bidner, Livonia, Mich.

[73] Assignee: Ford Global Technologies, Inc., Dearborn, Mich.

[21] Appl. No.: 748,082

[22] Filed: Nov. 13, 1996

[51] Int. Cl.$^6$ .................... G01M 15/00

[52] U.S. Cl. .................... 73/118.1; 364/431.03

[58] Field of Search .................... 73/117.2, 117.3, 73/118.1, 118.2, 116; 364/431.03

[56] References Cited

U.S. PATENT DOCUMENTS

| | | | |
|---|---|---|---|
| 4,782,690 | 11/1988 | Terasaka | 73/116 |
| 5,331,936 | 7/1994 | Messih et al. | 123/480 |
| 5,408,966 | 4/1995 | Lipinski et al. | 123/198 |
| 5,503,129 | 4/1996 | Robichaux et al. | 123/481 |

*Primary Examiner*—George M. Dombroske

*Attorney, Agent, or Firm*—Jerome R. Drouillard; Roger L. May

[57] ABSTRACT

A method and apparatus is provided for determining if the valve deactivator on a variable displacement internal combustion engine is functioning properly. The occurrence of an asymmetry in one of the cylinder banks when making fuel mass calculations during the fractional mode (four cylinders) and the presence of substantial symmetry in fuel mass calculations during maximum mode (eight cylinders) of engine operation indicates a possible deterioration of the valve deactivator. Also, if the ratio of the difference between the expected MAP and the actual MAP during fractional cylinder mode and maximum cylinder mode exceed a calibratable value possible valve deactivator deterioration is also indicated. In a preferred embodiment, these two monitoring methods are combined to provide a more robust indicator, so that if both indicate a possible problem, then an indicator lamp is illuminated to signal that service personnel should check whether the valve activators are properly functioning.

12 Claims, 5 Drawing Sheets

METHOD AND APPARATUS FOR MONITORING A VALVE DEACTIVATOR ON A VARIABLE DISPLACEMENT ENGINE

TECHNICAL FIELD

This invention relates to variable displacement engines (VDE) and, more particularly, to monitoring whether the cylinder valve deactivators in a VDE are functioning properly.

BACKGROUND ART

Automotive vehicle designers and manufacturers have realized for years that it is possible to obtain increased fuel efficiency by operating an engine on less than its full complement of cylinders during certain running conditions. Accordingly, at low speed, low load operation, it is possible to save fuel by operating the engine on four cylinders instead of eight cylinders, or three cylinders instead of six cylinders.

The VDE controller has the capability of disabling selected cylinders in the engine, causing the engine to have a decreased effective displacement, through control of a plurality of engine cylinder valve deactivators. For example, with an eight-cylinder engine, the controller may operate the engine on three, four, five, six, seven, or eight cylinders, as warranted by the driver's demanded torque, a specific emissions calibration, and environmental conditions.

If a valve deactivator does not deactivate a cylinder in one of the banks, when the engine is switched from an eight-cylinder mode, where fuel is supplied to two banks of four cylinders each, to a four-cylinder mode, where fuel is supplied to two banks of two cylinders each, air will be blown through a third cylinder of one of the banks and into the exhaust passage. The mass air flow (MAF) sensor detects this flow and the fuel controller increases the supply of fuel in order to maintain the desired air/fuel ratio (A/F). The unaffected bank thus experiences a 25% increase in fuel delivery due to the detected increase in mass air flow, but the air flow to the unaffected bank is unchanged, producing a rich exhaust mixture. The rich exhaust mixture is detected by the exhaust gas oxygen (EGO) sensor located in the engine exhaust passage associated with the unaffected band of cylinders that supplies data to the fuel controller. The fast adaptive correction factor (LAMBSE) used in the fuel control equation will migrate to compensate for the rich exhaust mixture. Feedback control of fuel delivery to the affected bank is unable to respond properly due to the two very rich cylinders (25%) events and the extremely lean cylinder event rapidly passing by the EGO sensor in the exhaust passage of the affected bank of cylinders.

The required closed loop fuel flow may be expressed as:

fuel_mass=(air_mass*KAMREF)/(equivalence_ratio*LAMBSE)

where:

equivalence_ratio=14.6 for example.

From this fuel mass calculation a fuel pulse width can be determined based on the fuel injector characteristic function.

The effect of a valve deactivator not deactivating a valve, is a step function increase in the short term closed loop correction factor LAMBSE and the long term correction factor KAMREF over time will correct the asymmetry. In feedback control the short term correction factor LAMBSE term will be driven to a value necessary to achieve stoichiometric A/F. This will happen very quickly because the feedback system is designed to ramp fuel pulse width as much as is required to achieve EGO switches. The long term trim, KAMREF, will respond to LAMBSE and is intentionally learned at a slow rate so it can differentiate true error from noise such as that which occurs during transients.

SUMMARY OF THE INVENTION

In accordance with the present invention, a method and apparatus is provided for determining if the valve deactivator on a variable displacement internal combustion engine is functioning properly. This is done by checking for an asymmetry in one of the cylinder banks when calculating the fuel mass required to maintain a desired air/fuel ratio in the fractional mode (four cylinders) and also detecting the presence of substantial symmetry during fuel mass calculations in the maximum mode (eight cylinders) of operation.

Improper operation or deterioration of a valve deactivator in one cylinder bank will cause an artificial asymmetric shift of the short term adaptive trim correction factor used in calculating the fuel mass to achieve a desired A/F. The presence of this asymmetry in four-cylinder fractional mode, prior to entry into an eight-cylinder maximum mode, and the presence of substantial symmetry in the eight-cylinder mode is an indication of a potential valve deactivator problem and a flag is set. Also, the presence of a difference between the expected manifold absolute pressure (MAP) and the actual MAP during fractional cylinder mode and the absence of such a difference in maximum cylinder mode is indicative of a potential valve deactivator problem.

Accordingly, in a preferred embodiment, these two monitoring methods are combined to provide a robust indicator, so that if both indicate a possible problem, then an indicator lamp is illuminated to signal that service should be performed to check whether the valve activators are properly functioning.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
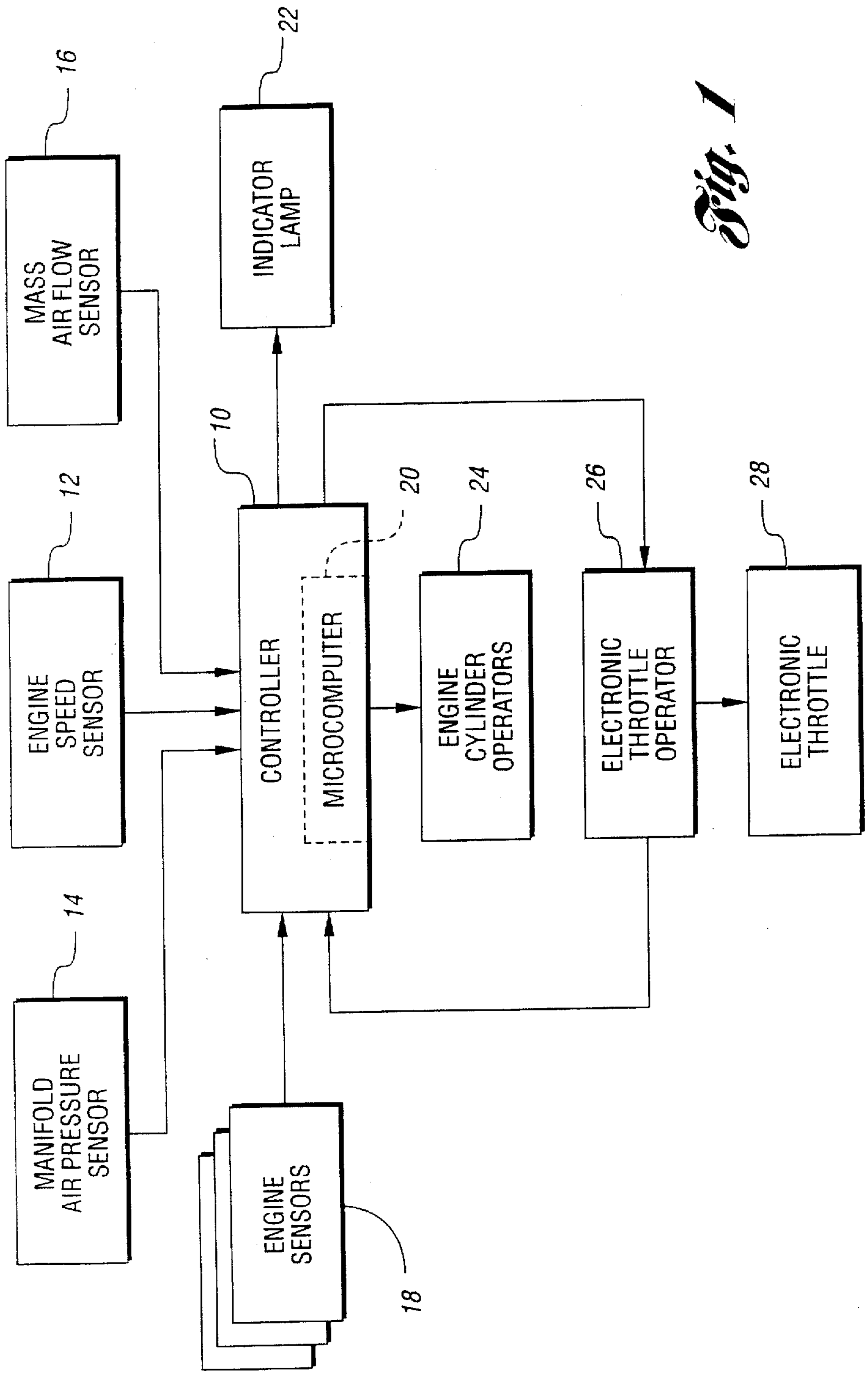
FIG. 1 is a block diagram of a valve deactivator monitoring system for a variable displacement engine.

Referring now to the drawings and initially to FIG. 1, a control system for an internal combustion engine includes a controller 10 that receives inputs from a sensor 12 that senses engine speed, a sensor 14 that senses the engine manifold absolute pressure, a sensor 16 that senses mass air flow to the engine, and various sensors 18 for measuring other engine characteristics such as throttle position, air charge temperature, and other characteristics known to those skilled in the art and suggested by this disclosure. The sensors 18 also include a pair of exhaust gas oxygen sensors, one for monitoring the oxygen content in each of the two engine cylinder banks.

Controller 10 includes a microcomputer 20 that utilizes the inputs from the various sensors and its own stored program and data, which may include limit values for various engine parameters or time-oriented data. Though not shown, it will be understood that microcomputer 20 includes an arithmetic logic unit (ALU), read only memory (ROM) for storing control programs and calibration data, random access memory (RAM) for temporary data storage, that may also be used for counters or timers, and keep-alive memory (KAM) for storing learned values. The ROM, RAM and KAM communicate with the ALU over an internal data bus as is well known. The controller 10 outputs a fuel injector signal to engine fuel injectors, that is varied over time to maintain a desired air/fuel ratio.

The controller 10 has the capability of disabling selected cylinders in the engine, causing the engine to have a decreased effective displacement, through control of a plurality of engine cylinder operators 24. An engine operating with less than its full complement of cylinders is said to be in fractional mode, as opposed to maximum mode which utilizes all engine cylinders to provide maximum effective displacement. For example, with an eight-cylinder engine, controller 10 may operate the engine on three, four, five, six, seven, or eight cylinders, as warranted by the driver's demanded torque, a specific emissions calibration, and environmental conditions.

Those skilled in the art will appreciate that a number of different disabling devices are available for selectively rendering inoperative one or more engine cylinders. Such devices include mechanisms for preventing any of the cylinder valves in a disabled cylinder from opening, such that gas remains trapped within the cylinder.

Controller 10 operates electronic throttle operator 26, which may comprise a torque motor, stepper motor, or other type of device which positions an electronic throttle 28 that provides feedback to controller 10 regarding throttle position. The controller 10 controls the illumination of an indicator lamp 22 in accordance with the flowcharts shown in FIG. 2–4.

The mass air flow signal from sensor 16, and other data such as the number of cylinders, engine speed, and barometric pressure, is used by the microcomputer 20 to calculate a cylinder air charge value using a manifold filling model during steady-state conditions. The air charge value is used in calculating the fuel to be supplied to the engine cylinder. Details regarding the calculation of cylinder air charge may be found in commonly assigned U.S. Pat. No. 5,331,936 to Messih et al the disclosure of which is incorporated herein by reference.

Figure 4:
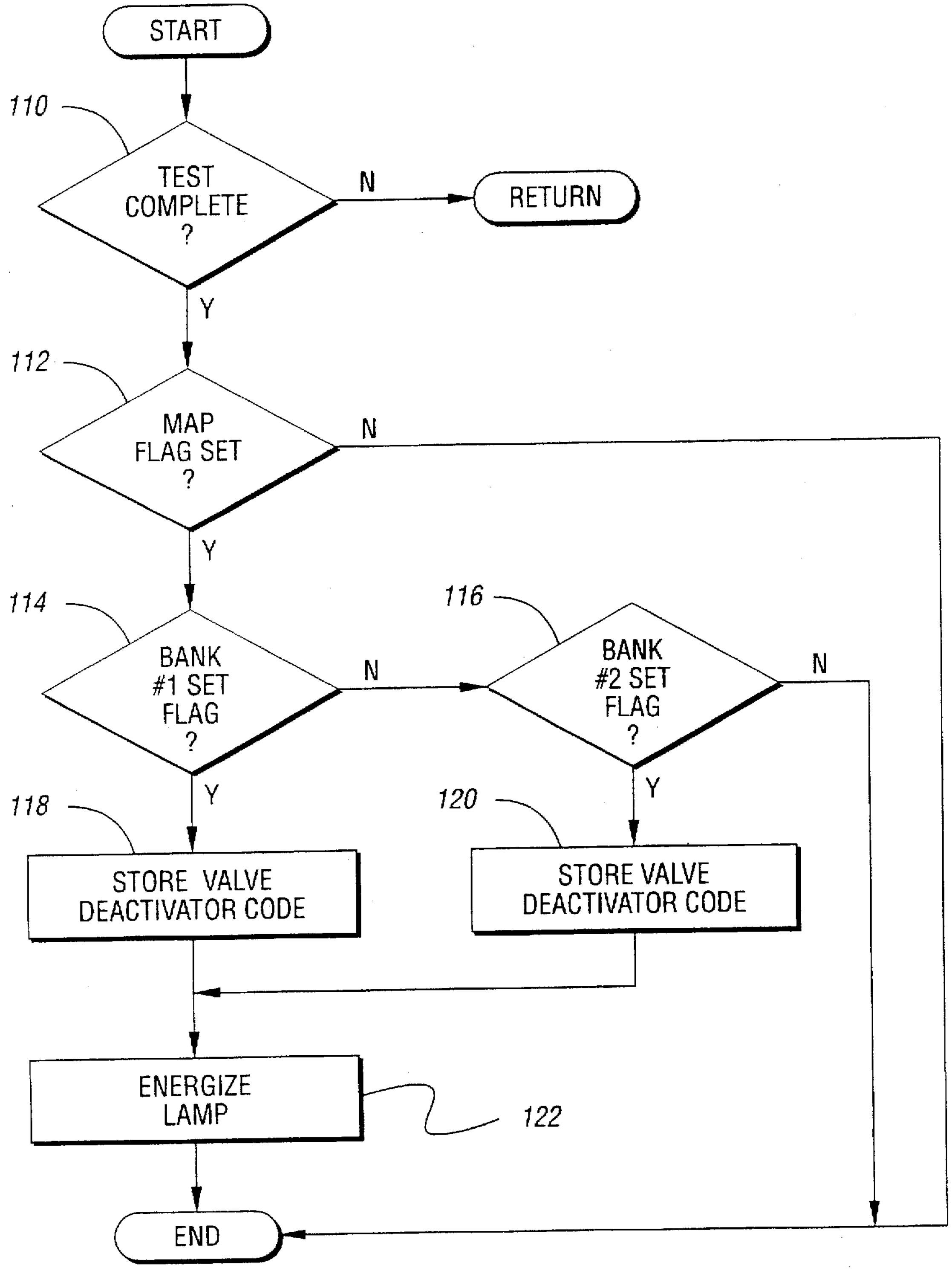

The cylinder air charge value is also used to infer a manifold absolute pressure (MAP) in accordance with the following equation developed in the aforementioned Messih et al patent.

$$MAP=[(B0+B1*N+B2*N^{2})\ (BP/29.92)]+B3*Mc$$

where:

MAP is the inferred manifold absolute pressure at a given barometric pressure (BP);

BP is barometric pressure (in.Hg.);

29.92 is the standard barometric pressure (in.Hg.);

N is the engine speed in RPM;

B0, B1, B2, B3 are engine design specific regression coefficients; and Mc is the cylinder air charge; and is inferred by the controller 10 in accordance with the flowchart shown in FIG. 4 of the Messih et al patent, based in part on mass air flow measured by sensor 16.

The manifold absolute pressure from sensor 14 is utilized by the microcomputer 20 to calculate a cylinder air charge value using a conventional speed density model during transition between fractional and maximum modes.

Figure 2A:
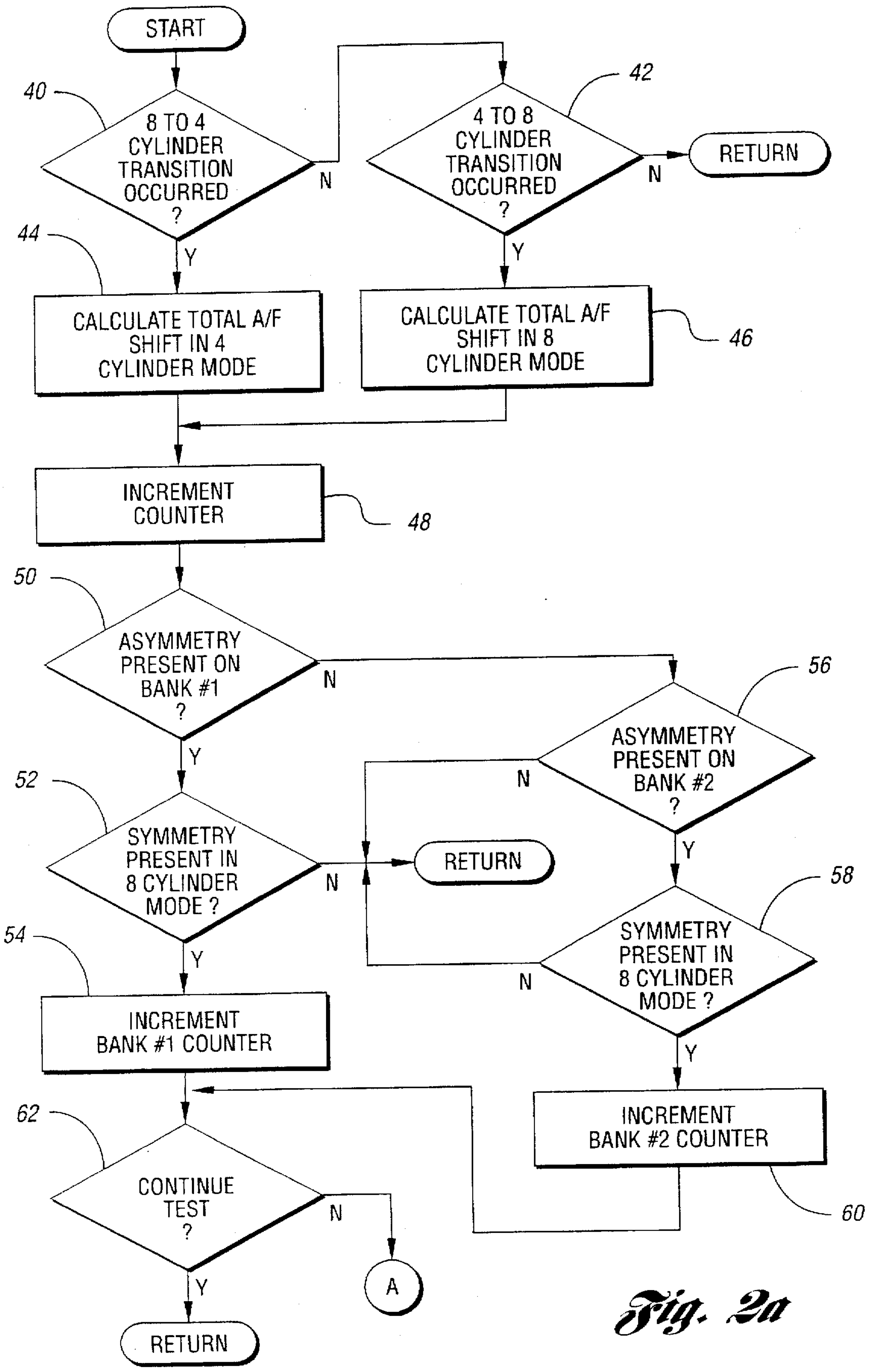
FIGS. 2*a*, 2*b*, 3 and 4 are flowcharts illustrating the operation of the system generally depicted in FIG. 1.
Figure 2B:
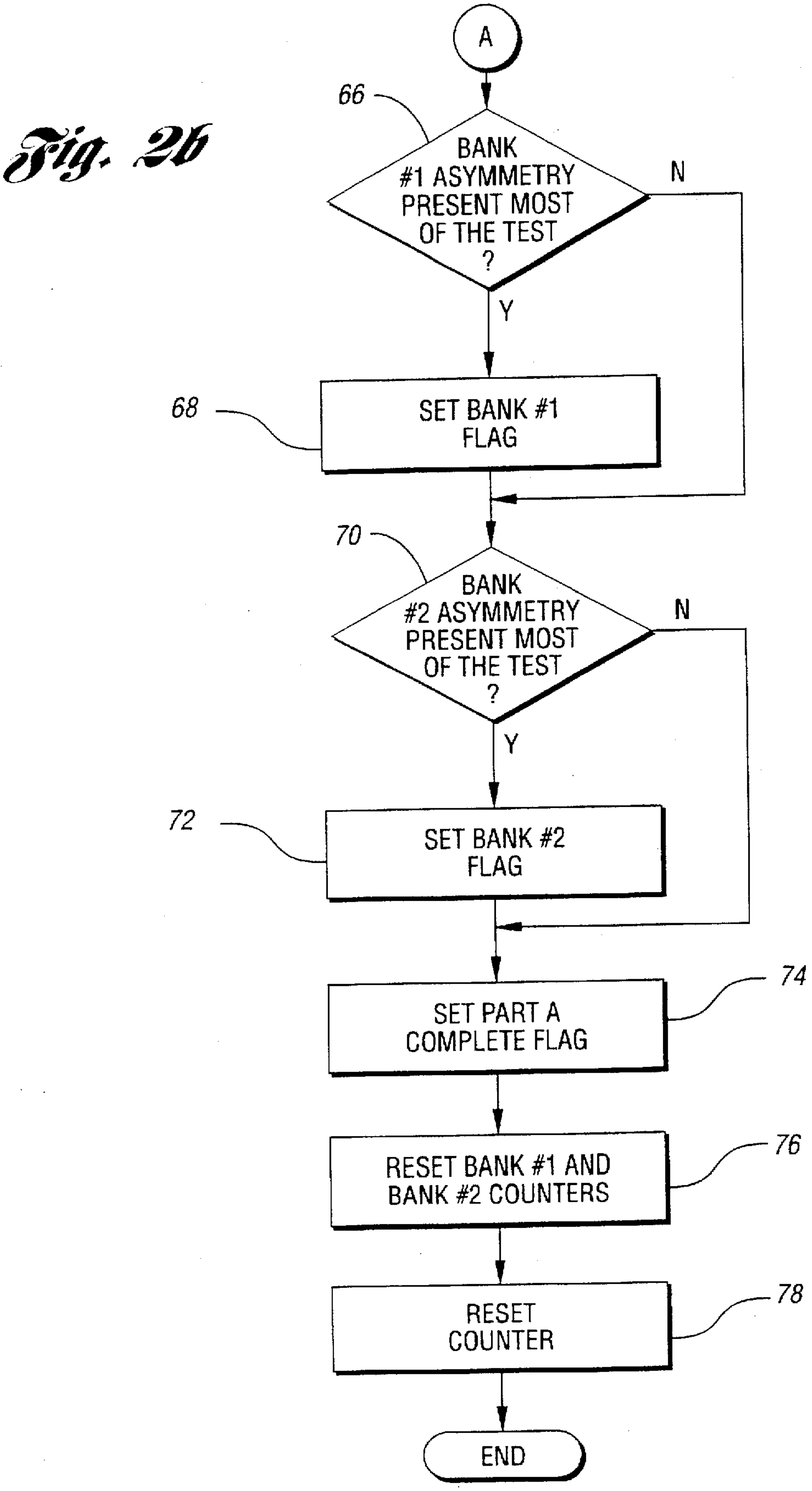
Figure 3:
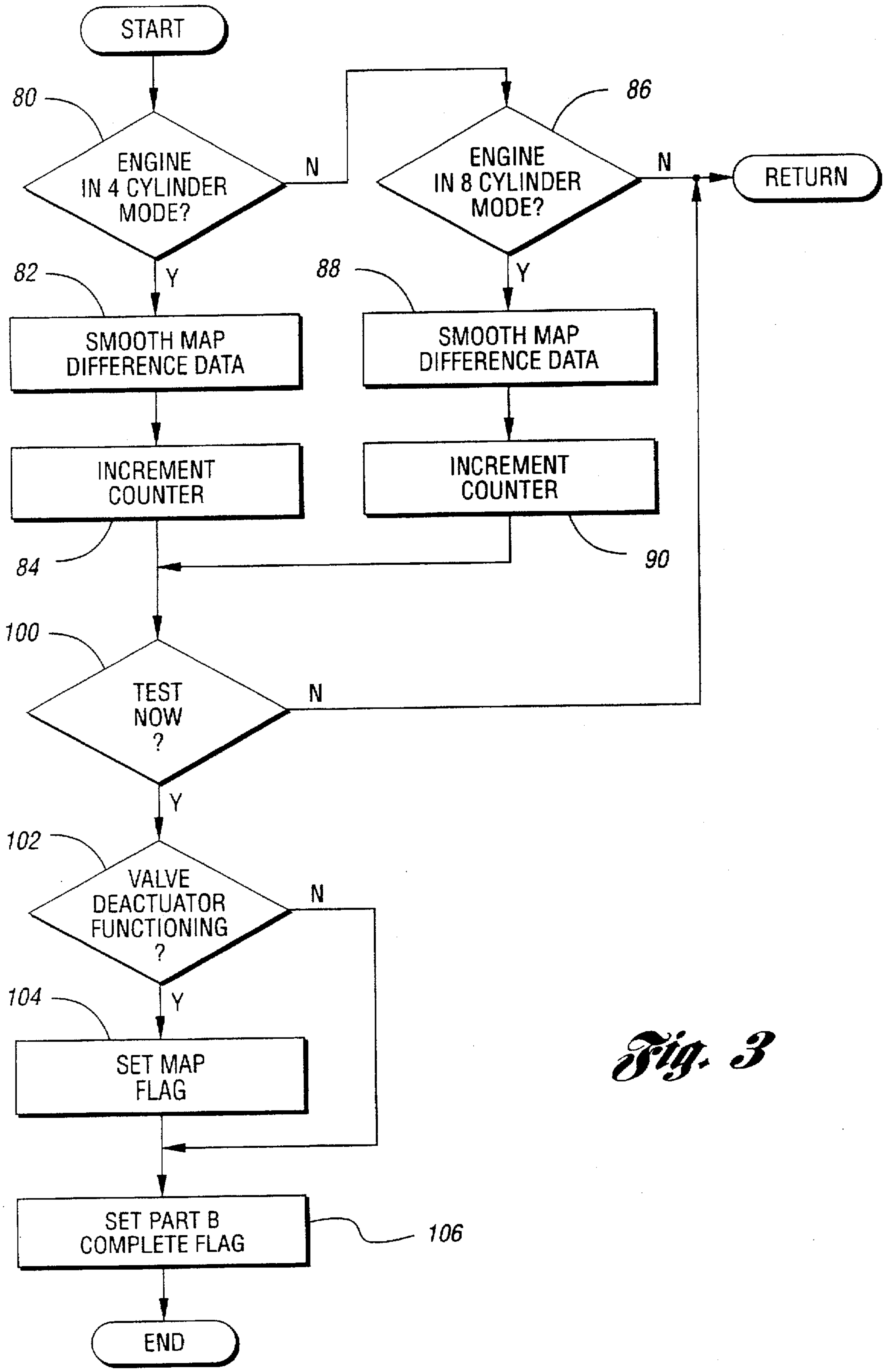

Referring now to FIGS. 2–4, flowcharts depicting the method of monitoring for possible valve deactivation problems is shown. In this example an eight-cylinder engine is assumed with four cylinders being operated during the factional mode. At blocks 40 and 42, a check is made to determine whether the engine is in a steady-state fractional or maximum mode of operation. If the engine is not in a steady-state, four- or eight-cylinder mode but in the process of switching between modes, the subroutine returns to the main program. If block 40 indicates a transition to four-cylinder mode of operation has occurred, the total A/F ratio control point shift between bank #1 and bank #2 is calculated in block 44. This is done by dividing the short term and long term correction factors that are used in the calculation of fuel mass. Thus, the shift in bank #1 during fractional mode may be expressed as:

$$\mathrm{AFR\_SHT1X4}=\mathrm{LAM\_BAR1X4}/\mathrm{KAM\_BAR1X4}$$

and the shift in bank #2 during fractional mode may be expressed as:

$$\mathrm{AFR\_SHT2X4}=\mathrm{LAM\_BAR2X4}/\mathrm{KAM\_BAR2X4}$$

Similarly, if block 42 indicates a transition to eight-cylinder mode of operation has occurred, the total A/F ratio control point shift between bank #1 and bank #2 is calculated in block 46. The shift in bank #1 during maximum mode may be expressed as:

$$\mathrm{AFR\_SHT1X8}=\mathrm{LAM\_BAR1X8}/\mathrm{KAM\_BAR1X8}$$

and the shift in bank #2 during maximum mode may be expressed as:

$$\mathrm{AFR\_SHT2X8}=\mathrm{LAM\_BAR2X8}/\mathrm{KAM\_BAR2X8}$$

At block 48, a software counter CNT_TEST is incremented to count the number of transition that have occurred; and at block 50, a check is made whether an asymmetry exist during factional mode between the A/F control point shift on the respective cylinder banks. An asymmetry exists if the difference between the A/F control point shift on the two banks exceeds a calibratable value AFR_ASYM4CAL, and may be expressed as:

$$\mathrm{AFR\_SFT1X4}-\mathrm{AFR\_SFT2X4}>\mathrm{AFR\_ASYM4CAL}$$

If an asymmetry does exist in the fractional mode, a check is made at block 52 to determine whether substantial symmetry, exists during the maximum mode. Substantial symmetry exists if the absolute value of the difference in the air/fuel ratio shift between the two banks in the maximum mode is less that a calibratable value and may be expressed as:

$$|\mathrm{AFR\_SFT1X8}-\mathrm{AFR\_SFT2X8}|<\mathrm{AFR\_ASYM8CAL}$$

If an asymmetry exists in the fractional mode AND substantial symmetry exists in the maximum mode, a counter BK1_CNT is incremented at block 54.

Alternatively, if no asymmetry exists on bank #1 as determined by block 50, then at block 56 a check is made whether a fractional mode asymmetry, greater than the calibratable value AFR_ASYM4CAL, exists on bank #2 as expressed by:

$$\mathrm{AFR\_SFT2X4}-\mathrm{AFR\_SFT1X4}>\mathrm{AFR\_ASYM4CAL}$$

If an asymmetry does exist on bank #2 in the fractional mode, a check is made at block 58 to determine if substantial symmetry exists during the maximum mode as expressed by:

|AFR_SFT2X8–AFR_SFT1X8|<AFR_ASYM8CAL

If an asymmetry exists in the fractional mode AND substantial symmetry exists in the maximum mode, a counter BK2_CNT is incremented at block 60.

If no asymmetry exists on either bank in fractional mode OR if substantial symmetry does not exist in the maximum mode, the subroutine returns to the main program without incrementing the counter at blocks 54 or 60. At block 62, the counter TEST_CNT is checked to see if a sufficient number of asymmetry checks have been made to produce valid data. If the test should be continued, the subroutine returns to the main program. Otherwise, a check is made at block 66 to determine whether a bank #1 asymmetry was present during a calibratable portion of the test period. This may be expressed as:

BK1_CNT/TEST_CNT>5CYL_CAL

If the calibration value 5CYL_CAL is exceeded, a flag CHK_BK1_FLG is set at block 68.

If the calibration value 5CY_CAL is not exceeded, a check is made at block 70 to determine whether a bank #2 asymmetry was present during the calibratable portion of the test period. This may be expressed as:

BK2_CNT/TEST_CNT>5CYL_CAL

If the calibration value 5CY_CAL is exceeded, a flag CHK_BK2_FLG is set at block 72.

After checking whether or not the counters exceeds the calibration value 5CY_CAL, a flag PART_A_FLG is set at block 74, and the BK1_CNT and BK2_CNT counter are reset at block 76, and the counter TEST_CNT is reset at block 78.

Referring now to FIG. 3, a flowchart depicts the monitoring and reporting of the condition of the MAP sensor. If the engine is operating in a fractional mode as determined by block 80, data representing a rolling average of the difference (DELTA_MAP) between an inferred MAP value based on cylinder air charge obtained from a manifold filling model, and measured data from a MAP sensor is determined at block 82. The smoothed data may be represented by:

DEL_MAP_4_AVE=ROLAVE (DELTA_MAP)

A MAP test counter MAP_4_CNTR is incremented at block 84.

Similarly, if the engine is operating in maximum mode as determined by block 86, a rolling average of the difference between the estimated MAP in eight-cylinder mode and measured MAP in eight-cylinder mode is determined to obtain an smoothed difference or DELTA_MAP_8_AVE at block 88. The smoothed data may be represented by:

DEL_MAP_8_AVE=ROLAVE(DELTA_MAP)

A MAP test counter MAP_8_CNTR is incremented at block 90. If the engine is not in a steady-state fractional or maximum mode, but rather transitioning between modes, the subroutine returns to the main program.

At block 100 a check is made to determine whether sufficient data has been collected to make a decision regarding the condition of a cylinder valve deactivator based on MAP data. The decision is YES if both the MAP_4_CNTR counter AND the MAP_8_CNTR have exceeded respective counter limits CNT_MAX_4 and CNT_MAX_8. If both counter limits are exceeded, the ratio of the smoothed data in fractional mode to the smoothed data in maximum mode is compared in block 102 to a calibratable value VALVE CAL. Otherwise, the subroutine returns to the main program.

At block 102, a decision is made whether the valve de-actuator is functioning properly based on DELTA_MAP data. The conditional may be expressed as:

DELTA_MAP_4/DELTA_MAP_8<VALVE_CAL

If the ratio is less than VALVE_CAL, a flag MAP_FLG is set at block 104 and in any event a flag PART_B_FLG is set at block 106.

Referring now to FIG. 4, a flowchart is depicted for deciding whether the valve deactivator code should be stored along with energization of the indicator lamp 22. At block 110, a check is made whether both the PART_A_FLG and the PART_B_FLG are set, indicative of completion of the two test depicted in FIGS. 2 and 3, respectively. If not, the program ends.

If both tests have been completed AND block 112 indicates that flag MAP_FLG is set, block 114 checks whether CHK_BK1_FLG is set. If so, then a bank #1 valve deactivator code is stored at block 118. If not, block 116 checks whether CHK_BK2_FLG is set. If not, the program ends. If so, a bank #2 valve deactivator code is stored at block 120. If either code is stored, the indicator lamp 22 is energized at block 122 and the program ends. The energization of the lamp 22 provides an indication to the operator that a valve deactivator may be in a deteriorated state and should be checked by a service technician.

While the best mode for carrying out the present invention has been described in detail, those familiar with the art to which this invention relates will recognize various alternative designs and embodiments for practicing the invention as defined by the following claims.

What is claimed is:

1. A method for determining if a valve deactivator on a variable displacement internal combustion engine is functioning properly comprising the steps of:

checking for an asymmetry in a fuel mass calculation between two cylinder banks of the engine during fractional mode of engine operation;

checking for substantial symmetry in the fuel mass calculation between the two cylinder banks of the engine during maximum mode of engine operation; and storing a valve deactivator fault code if an asymmetry exists during said fractional mode and substantial symmetry exists during said maximum mode.

2. The method defined in claim 1 including the further step of energizing an indicator.

3. The method defined in claim 1 wherein a predetermined number of checks for asymmetry must be performed in order to make a decision on whether to store said code.

4. The method defined in claim 3 wherein fractional mode asymmetry must exist for a predetermined percentage of said checks for asymmetry.

5. The method defined in claim 4 wherein the code stored identifies the bank of cylinders where the asymmetry occurred.

6. The method defined in claim 5 including the further steps of:

calculating a value of manifold absolute pressure based on cylinder air charge;

sensing a value of manifold absolute pressure;

evaluating the calculated and sensed value of manifold absolute pressure to determined the validity of the sensed value; and storing said code only if both the number of times both fractional mode asymmetry and maximum mode substantial symmetry is detected is greater than a predetermined percentage of said number of checks for asymmetry, and said sensed value is determined to be invalid.

7. Apparatus for determining if a valve deactivator on a variable displacement internal combustion engine is functioning properly comprising:

a computer;

sensor means supplying data to said computer;

said computer using said data for calculating fuel mass for two cylinder banks of the engine during fractional mode of engine operation and during maximum mode of engine operation;

said computer detecting when a difference between a fractional mode calculation for one cylinder bank and a fractional mode calculation for the other cylinder bank exceeds a stored value, said computer detecting whether the absolute value of a difference between a maximum mode calculation for one cylinder bank and a maximum mode calculation for the other cylinder bank is less than a stored value;

said computer storing a valve deactivator fault code both of said differences are detected.

8. The apparatus defined in claim 7 further including an indicator;

said computer causing said indicator to be energized upon storage of said code.

9. The apparatus defined in claim 8 wherein the code stored identifies which bank of cylinders has an improperly functioning valve deactivator.

10. The apparatus defined in claim 9 wherein:

said sensor means includes a manifold absolute pressure sensor;

said computer calculating a value of manifold absolute pressure based on estimated cylinder air charge;

said computer evaluates the calculated and sensed value of manifold absolute pressure to determined the validity of the sensed value and stores said code only if both the fractional and maximum mode differences are detected and said sensed value is determined to be invalid.

11. A method for determining if a valve deactivator on a variable displacement internal combustion engine is functioning properly comprising the steps of:

checking for an asymmetry in a fuel mass calculation between two cylinder banks of said engine during fractional mode of engine operation;

checking for substantial symmetry in the fuel mass calculation between the two cylinder banks of the engine during maximum mode of engine operation;

storing a valve deactivator code if an asymmetry exists during said fractional mode and substantial symmetry exist during said maximum mode;

wherein a predetermined number of checks for asymmetry must be performed in order to make a decision on whether to store said code;

wherein fractional mode asymmetry must exist for a predetermined percentage of the number of checks for asymmetry;

wherein the code stored identifies the bank of cylinders where the asymmetry exist; and wherein asymmetry exist if a difference exist between a ratio of short and long term correction factors on one bank of cylinders and a ratio of short and long term correction factors on the other bank of cylinders and said difference exceeds a calibratable value.

12. The method defined in claim 11 including the further steps of:

calculating a value of manifold absolute pressure based on cylinder air charge;

sensing a value of manifold absolute pressure;

evaluating the calculated and sensed value of manifold absolute pressure to determined the validity of the sensed value; and storing said code only if both the number of times both fractional mode asymmetry and maximum mode substantial symmetry exist is greater than a predetermined percentage of said number of checks for asymmetry, and said sensed value is determined to be invalid.

* * * * *